United States Patent
Nickel

(10) Patent No.: US 10,298,415 B2
(45) Date of Patent: May 21, 2019

(54) USER STATION FOR A BUS SYSTEM AND METHOD FOR THE WIDEBAND CAN COMMUNICATION

(71) Applicant: Robert Bosch GmbH, Stuttgart (DE)

(72) Inventor: Patrick Nickel, Birstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 98 days.

(21) Appl. No.: 15/507,578

(22) PCT Filed: Jul. 14, 2015

(86) PCT No.: PCT/EP2015/066056
§ 371 (c)(1),
(2) Date: Feb. 28, 2017

(87) PCT Pub. No.: WO2016/020155
PCT Pub. Date: Feb. 11, 2016

(65) Prior Publication Data
US 2017/0264458 A1 Sep. 14, 2017

(30) Foreign Application Priority Data

Aug. 5, 2014 (DE) .................. 10 2014 215 465

(51) Int. Cl.
*H04L 12/40* (2006.01)
*H04L 25/02* (2006.01)
*H04L 12/413* (2006.01)

(52) U.S. Cl.
CPC ........ *H04L 12/4015* (2013.01); *H04L 12/413* (2013.01); *H04L 25/0202* (2013.01);
(Continued)

(58) Field of Classification Search
CPC ............... H04L 12/4015; H04L 12/413; H04L 25/0202; H04L 25/0226; H04L 2012/40215
See application file for complete search history.

(56) References Cited

U.S. PATENT DOCUMENTS 6,014,385 A * 1/2000 Ayanoglu ............... H04L 12/417
370/458
2003/0070019 A1* 4/2003 Dalakuras ......... H04L 12/40156
710/110
(Continued)

FOREIGN PATENT DOCUMENTS

DE 102009026961 A1 12/2010
DE 102012220488 A1 5/2014
(Continued)

OTHER PUBLICATIONS

International Search Report dated Oct. 15, 2015, of the corresponding International Application PCT/EP2015/066056 filed Jul. 14, 2015.
Bosch Gmbh, Robert: "CAN with Flexible Data-Rate Specification Version 1.0" Apr. 17, 2012.

*Primary Examiner* — Habte Mered
(74) *Attorney, Agent, or Firm* — Norton Rose Fulbright US LLP; Gerard Messina

(57) ABSTRACT

A user station for a bus system and a method for the wideband communication in a bus system are provided. The user station includes a communications-control unit for preparing or reading at least one message for/from at least one further user station of the bus system, in which an exclusive, collision-free access of a user station to a bus line of the bus system is ensured at least intermittently; the communications-control unit is designed to prepare channel-status information according to a time sequence for the transmission specified in the bus system for the user station (Continued)

so that the user station does not have to send the channel-state information in each message, and the channel-status information includes information for ascertaining the channel characteristic between the user station and the further user station of the bus system to which the message is to be sent.

12 Claims, 5 Drawing Sheets

(52) U.S. Cl.
CPC ...... *H04L 25/0212* (2013.01); *H04L 25/0224* (2013.01); *H04L 25/0226* (2013.01); *H04L 2012/40215* (2013.01)

(56) References Cited

U.S. PATENT DOCUMENTS

| 2004/0085917 | A1  | 5/2004 | Fitton et al. |
| 2013/0022053 | A1* | 1/2013 | Vasseur ................... H04L 47/10 |
|              |     |        | 370/428 |
| 2014/0119381 | A1* | 5/2014 | Diab ........................ H04L 12/40 |
|              |     |        | 370/431 |

FOREIGN PATENT DOCUMENTS

| EP | 0169548 A2 | 1/1986 |
| EP | 0851636 A1 | 7/1998 |

\* cited by examiner

USER STATION FOR A BUS SYSTEM AND METHOD FOR THE WIDEBAND CAN COMMUNICATION

FIELD

The present invention relates to a user station for a bus system and to a method for the wideband CAN communication in which a communication in a CAN bus system for higher speeds beyond CAN-FD is possible, and in which the required time for ascertaining the channel-status information is shortened.

BACKGROUND INFORMATION

The CAN bus system has come into widespread use for the communication between sensors and control units. For example, it is used in automobiles. In the CAN bus system, messages are transmitted using the CAN protocol as described in the CAN specification in ISO11898. Particularly automotive bus systems continuously evolve to higher bandwidths, lower latency times and stricter real-time capability. More recently, additional technologies such as CAN-FD, in which messages are transmitted in accordance with the specification "CAN with Flexible Data Rate, specification version 1.0" (source: http://www.semiconductors.bosch.de), were proposed for this purpose, etc. In such technologies the maximum data rate possible is increased beyond a value of 1 Mbit/s through the use of a higher synchronization in the area of the data fields.

In addition to primarily functional supplementations such as TTCAN, the expansion of the CAN standard with CAN-FD in the recent past was broadened in particular with regard to the possible (higher) data rate and the usable data packet size, while the original CAN characteristics, in particular in the form of the arbitration, were maintained. Furthermore, the signal representation in the data portion was essentially modified by a higher switching frequency of the signal statuses (high/low).

German Patent Application No. DE 10 2009 026961 A1 describes a method for transmitting data between user stations of a bus system. Here, an expansion of the existing CAN signal and the associated communications unit is described with regard to the utilization of high-frequency signals, which is impressed onto the bus line as a CAN data flow in arbitrary form, e.g., temporally in parallel or in embedded form. Proposed in this context in particular is a coordination of the signal, whether a synchronization signal, a trigger signal, with the CAN signal.

In order to further develop the CAN bus system to higher speeds beyond CAN-FD, there are concepts for the corresponding configuration and implementation of the physical layer. In a CAN-based communication, multiple recipients, which are generally connected to the line at different points of the communications bus, receive the transmitted information on a communications bus simultaneously for this purpose.

When a high-rate communication is employed, such as in the center frame portion of a CAN frame, i.e., between frame head and frame end, distortions are created in the received signal in the form of inter-symbol interference (ISI), for example.

For a robust reception, a recipient requires information about the channel status in the form of the current pulse response and about disturbance variables that are present. These variables are generally a function of the current transmitter/recipient pairing, which means, for example, that the pulse response on each receive path (different transmitters) must be known to a recipient in order to ensure that the message is able to be detected in a robust manner through the use of equalization, robust meaning sufficiently fault-free in this context. Given N users TN in the network, there are generally N*(N−1)/2 different pulse responses. This is due to the fact that each connection between two users TN normally has a different pulse response;

this pulse response is independent of a direction at a point in time, i.e., has the same form (reciprocity) for transmitter TN1->recipient TN2 and transmitter TN2->recipient TN1.

Generally, the required variables for the channel characterization, in particular the channel-pulse responses, are not initially known and available on the side of each recipient. Therefore, they must be newly estimated or adapted at regular intervals as a result of temperature effects, among other things. For the estimate, a user transmits, for example, a training sequence known to all sides, and the corresponding channel-pulse response is able to be estimated from its receive signal. This may take place at a plurality of receiving points simultaneously so that the emission of N (orthogonal) sequences is generally sufficient to characterize the entire network.

It is possible to accommodate the training sequence in the frame head of the CAN frame, for instance. However, in this case it is problematic that the emission of the training sequence requires approximately 5-25% of the temporal duration of a CAN frame. Accordingly, this reduces the net data rate of the system as a whole in comparison with the gross data rate inasmuch as the time used for emitting the training sequence is unable to be used for a data transmission. This becomes a particularly glaring problem in systems that have only a few users or user stations.

SUMMARY

It is ane object of the present invention to provide a user station for a bus system as well as a method, which solve the aforementioned problems. In particular, a user station for a bus system and a method are to be provided that allow for a further development of the CAN signal structures and the required communications units to higher data rates, and that minimize the time required for ascertaining the channel-status information.

This objective may be achieved by a user station for a bus system in accordance with the present invention. The user station may include, for example, a communications control unit for preparing or reading at least one message for/from at least one further user station of the bus system in which an exclusive, collision-free access of a user station to a bus line of the bus system is ensured at least intermittently; the communications control unit is designed to prepare channel-status information according to a time sequence for the transmission specified in the bus system for the user station, so that the user station does not have to send the channel-status information in every message. The channel-status information includes information for ascertaining the channel characteristic between the user station and the further user station of the bus system to which the message is to be sent.

The user station makes it possible to use novel communication formats in the center segment of the CAN frame; moreover, the required time for ascertaining the channel-status information is minimized.

Especially in a network that has only a few user stations or users, the method executed by the user station markedly shortens the time required for estimating the channel-pulse responses. In particular, the emitting of the training sequences is able to be carried out as a function of the user and no longer as a function of the message.

In addition, the CAN bus system is further designed for higher speeds beyond the CAN-FD by the user station so that essential application features are in conformance with existing CAN principles. A mixed operation is therefore possible, in which the user stations configured for the higher speeds are operated in mixed networks with existing CAN user stations or CAN nodes.

Depending on the requirements, the previously described user station is also suitable for use in systems that are capable of processing data rates beyond CAN-FD.

Advantageous further developments of the user station are described herein.

It is possible that the specified time sequence is a predefined cycle time, and that the communications control unit is designed to emit the channel-status information after this cycle time has elapsed; the length of the predefined cycle time is selected in such a way that all user stations of the bus systems would have been able to transmit the channel-status information once within the predefined cycle time; or it is conceivable that the specified time sequence, in addition to the predefined cycle time, includes that at least one user station of the bus system is designed to sporadically transmit the channel-status information.

It may also be the case that the communications control unit prepares the training sequence within the predefined cycle time in order to realize a one-time transmission of a training sequence as a separate frame within this predefined cycle time for all user stations of the bus system.

Preferably, the communications control unit is furthermore designed to transmit the channel-status information as a function of a user station, and/or it is possible that the channel-status information is included in a training sequence of the message.

The previously described user station may also include a memory unit for storing the channel-status information if the message includes the channel-status information.

The communications control unit may also be designed to ascertain whether the read message includes the channel-status information, and a memory unit is developed to store the channel-status information if the communications control unit determines that the read message includes the channel-status information.

Optionally, it is also possible that the previously described user station additionally includes a correction device for correcting the read message with the aid of the channel-status information; the correction device is designed to obtain the channel-status information from a training sequence of the message or to obtain it from a memory unit in case the message does not include a training sequence.

According to a further refinement, it is possible that apart from a frame head and a frame end, the message includes only the training sequence as data portion, or in another development, that the training sequence is embedded in a data frame as a message.

The previously described user station may be part of a bus system that furthermore includes a parallel bus line and at least two user stations which are connected to each other via the bus line so that they are able to communicate with each other. In this case, at least one of the at least two user stations is a previously described user station.

The previously mentioned objective may be achieved furthermore by a method for the wideband communication in a bus system in accordance with the present invention. The method includes the following steps: Preparing or reading, with the aid of a communications control unit, at least one message for/from at least one further user station of the bus system, in which system an exclusive, collision-free access of a user station to a bus line of the bus system is ensured at least intermittently; the communications control unit prepares channel-status information according to a time sequence for the transmission specified in the bus system for the user station, so that the user station does not have to send the channel-status information in every message. The channel-status information includes information for ascertaining the channel characteristic between the user station and the further user station of the bus system to which the message is to be sent.

The present method offers the same advantages as those previously mentioned with regard to the user station.

Further possible implementations of the present invention also include not explicitly mentioned combinations of features or specific embodiments described previously or in the following text with regard to the exemplary embodiments. The expert will also add individual aspects to the respective basic form of the invention as improvements or supplementations.

BRIEF DESCRIPTION OF THE DRAWINGS

The present invention is described in greater detail below with reference to the figures and on the basis of exemplary embodiments.

Unless otherwise indicated, identical or functionally equivalent elements in the figures have been provided with the same reference numerals.

DETAILED DESCRIPTION OF EXAMPLE EMBODIMENTS

Figure 1:
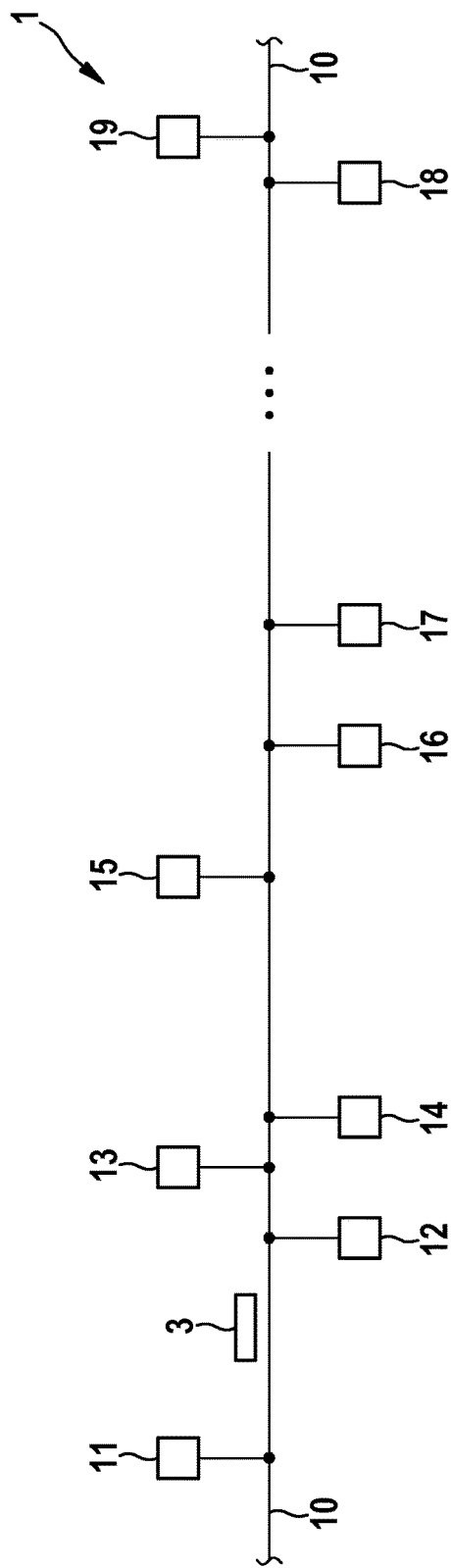
FIG. 1 shows a simplified circuit diagram of a bus system according to a first exemplary embodiment.

FIG. 1 shows a bus system 1 which, for example, may be a CAN bus system, a CAN-FD bus system, etc. Bus system 1 may be used in a vehicle, especially in a motor vehicle, in an airplane etc. or in the hospital, etc.

In FIG. 1, bus system 1 includes a parallel bus having a bus line 10. In this particular exemplary embodiment, nine users in the form of user stations 11 through 19 are connected to bus line 10. However, it is also possible that bus system 1 has more users, e.g., twelve or less, such as five users. Messages 3 in the form of signals are able to be transmitted between individual user stations 11 through 19 via bus line 10. User stations 11 through 19, for example, may be control units, sensors, display devices etc. of a motor vehicle.

Figure 2:
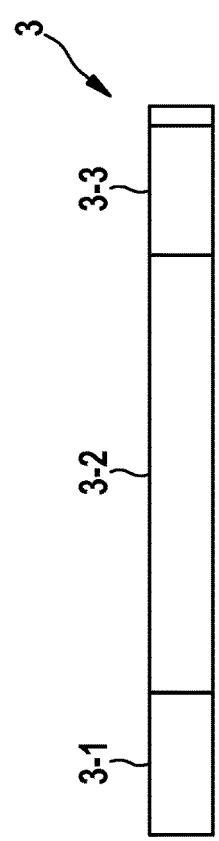
FIG. 2 shows a schematic representation of the structure of a message in a bus system according to the first exemplary embodiment.

As shown in FIG. 2, messages 3 have a frame head 3-1, a data portion 3-2, and a frame end 3-3, respectively.

Figure 3:
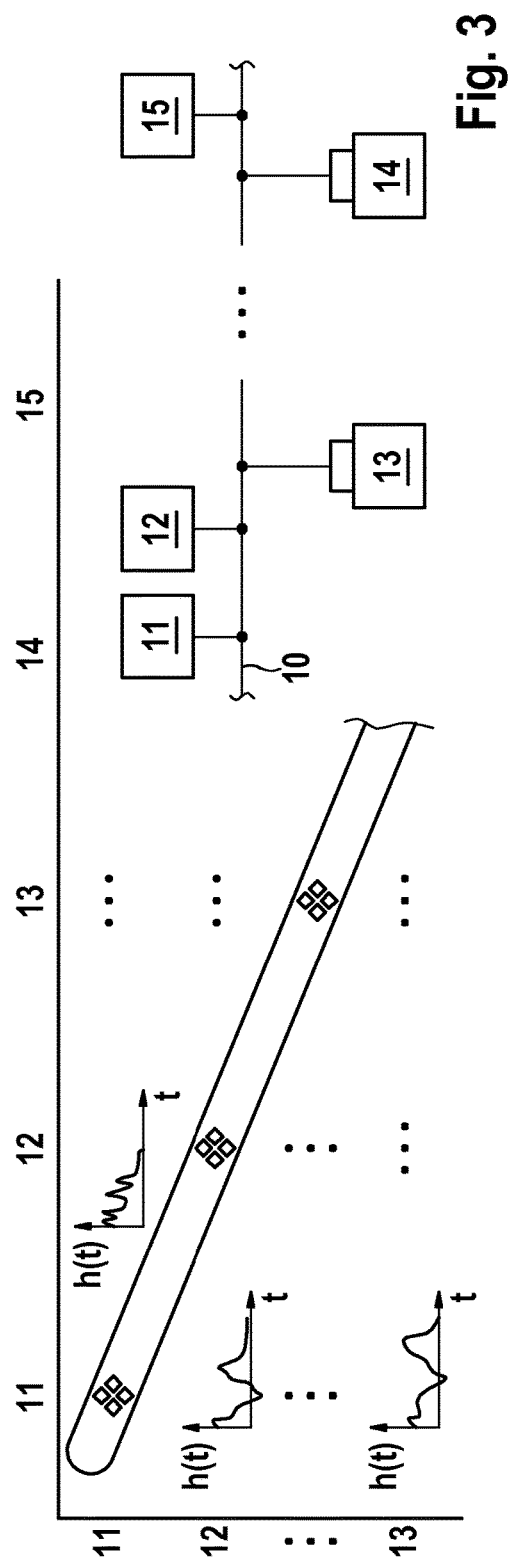
FIG. 3 shows a matrix for the schematic illustration of the diversity of the channel-pulse responses in the bus system according to the first exemplary embodiment.

FIG. 3 shows channel-pulse responses h(t) of the parallel bus from FIG. 1 as an example of user stations 11 through 15 as users of bus system 1. As illustrated in FIG. 3, each channel-pulse response h(t) depends on the sender/recipient pairing. Accordingly, in the event that user station 11 is the sender and user station 12 is the recipient, channel-pulse response h(t) is generally different than in a case in which user station 11 is the sender and user station 13 is the recipient. The same applies to the other sender/receiver pairings.

Figure 4:
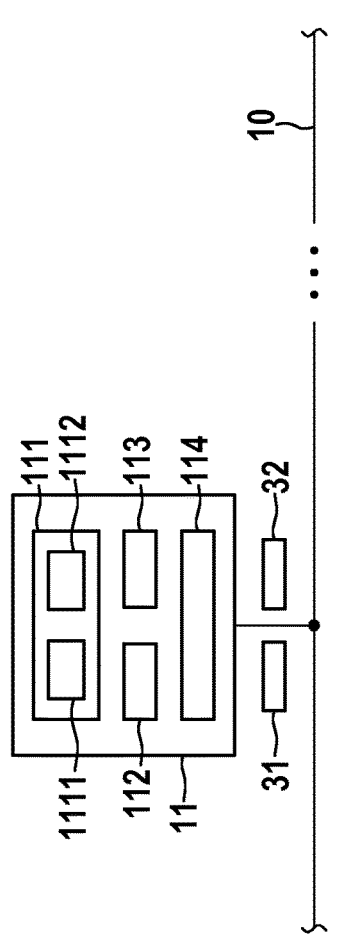
FIG. 4 shows a simplified circuit diagram of a user station of the bus system according to the first exemplary embodiment.

For this reason, user stations 11 through 19 are configured as illustrated in FIG. 4 with the aid of exemplary user station 11.

As shown in FIG. 4, user station 11 has a communications control unit 111, a memory unit 112, a correction device 113, and a transmit/receive device 114. Communications control unit 111 includes a data-frame preparation device 1111 for preparing an individual message as data frame 31 in the form of a signal for bus line 10, as well as a training sequence preparation device 1112 for preparing an individual training sequence 32 in the form of a signal for bus line 10.

Data frame 31 and training sequence 32 are prepared as separate messages 3, which are to be transmitted on bus line 10. In addition to the frame head and the frame end of a conventional message 3, at least data frame 31 includes a data field that has a high-rate data format in order to transmit data according to the specification for CAN-FD or to transmit data at a still higher data transmission rate. Data frame 31 includes only the data that are intended for the operation of the addressed user station, but it includes no information from which channel-status information is able to be derived. In contrast thereto, apart from the frame head and the frame end of a conventional message 3, training sequence 32 includes no data of the type that is contained in data frame 31. Training sequence 32 thus includes only data or information from which the channel-status information is derivable but no data that are intended for the other operation of the addressed user stations.

Memory unit 112 may be used for storing training sequences 32 and/or the channel-status information contained therein that user station 11 has already received from one of the other user stations 12 through 19 and/or that user station 11 has already prepared on its own. Correction device 113 is able to equalize, and thus correct, a signal received from transmit/receive device 114 with the aid of training sequence 32. Transmit/receive device 114 is directly connected to bus line 10 even if this is not shown in FIG. 4.

Communications control unit 111 is used for controlling a communication of user station 11 via bus line 10 with another user station of user stations 12 through 19 that are connected to bus line 10. Data-frame preparation device 1111, training-sequence preparation device 1112, memory unit 112, and correction device 113 are used for transmitting messages 3 at a high data rate on bus line 10 having a CAN bus topology, as will be described in greater detail later in the text. In all other respects, communications control unit 111 may be designed like a conventional CAN controller. With the exception of the functions described in the following text, transmit/receive device 114 may be developed in the way of a conventional CAN transceiver as far as its transmit and receive functionality is concerned.

In the exemplary embodiment at hand, user stations 12 through 19 have the same design as user station 11. As a result, the use of user stations 11 through 19 makes it possible to generate and subsequently transmit messages 3 also at higher data rates than CAN-FD. Even given the low number of users in bus system 1, a good or better net data rate than in a transmission according to the CAN protocol is achieved.

To estimate channel-pulse response h(t) according to FIG. 3, user station 11, for example, sends a training sequence 32, prepared by training-sequence preparation device 1112, to all user stations 12 through 19. Using the receive signal of training sequence 32, the receiving user station of user stations 12 through 19 is able to ascertain or estimate the corresponding channel-status information, such as channel-pulse response h(t), in particular with the aid of communications control unit 111, and then store it in memory unit 112. This may take place simultaneously at a plurality of receiving points, and thus at user stations of user stations 12 through 19. As a result, it is generally sufficient to emit N (orthogonal) training sessions 32 for the characterization of the entire bus system 1.

According to the exemplary embodiment at hand, the channel-status information, in particular channel-pulse response h(t), is not newly ascertained with each CAN message 3. This is possible because the channel properties and thus the channel statuses change only slowly. Accordingly, also the channel-status information contained in a training sequence 32 from a prior message 3, in particular training sequence 32, is reused in the exemplary embodiment at hand. To do so, a memory unit 112 is accessed, in which the previously received training sequences 32 and/or the channel-status information ascertained therefrom, especially channel-pulse response h(t), is/are stored. Stored is the particular information that is of interest to the respective user station of user stations 11 through 19. Dispensing with the renewed transmission of a training sequence 32 makes it possible to save time capacity of bus system 1.

Figure 5:
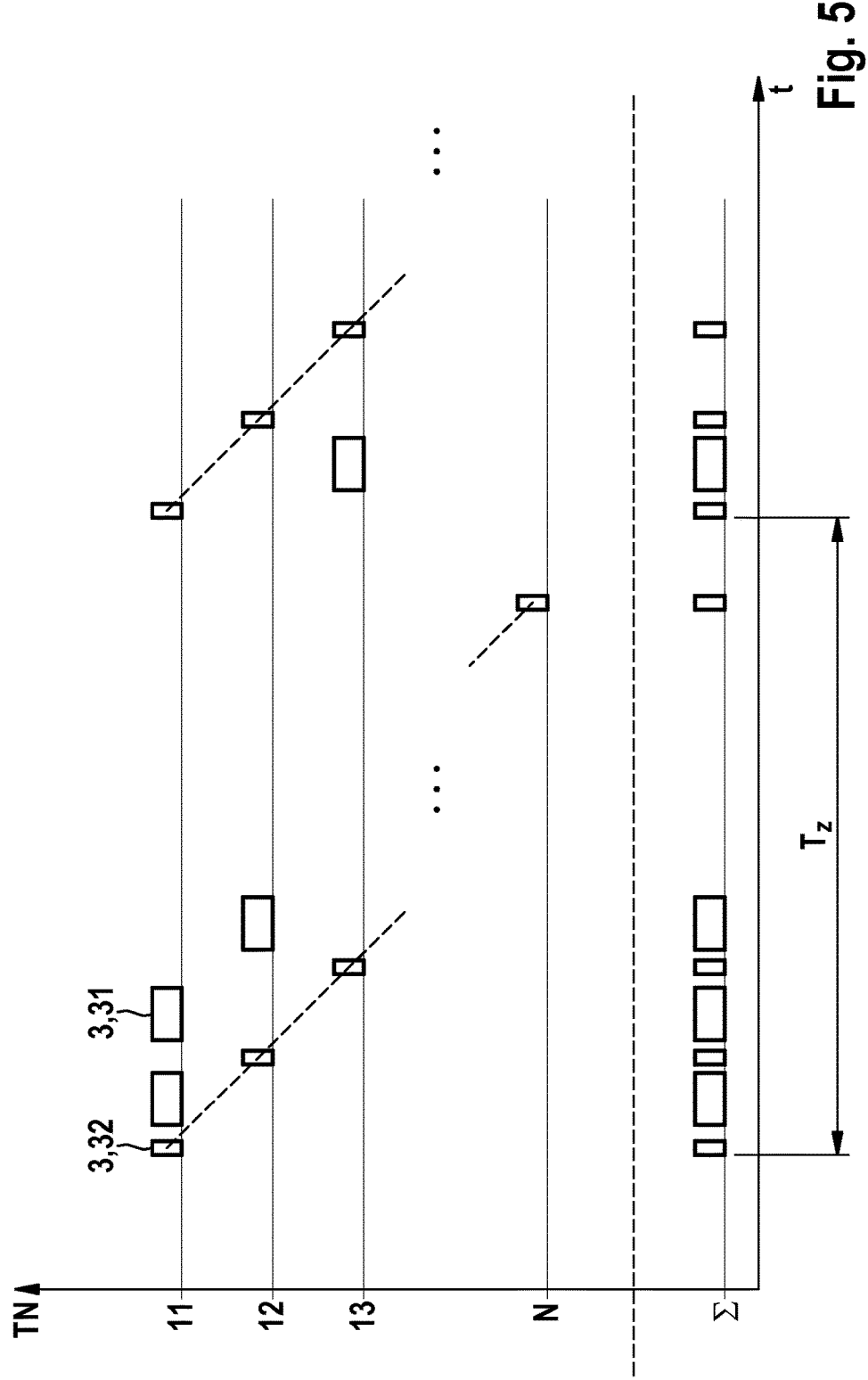
FIG. 5 shows a time sequence diagram to illustrate a transmission of messages of the individual user stations over the time in the bus system according to the first exemplary embodiment.

As shown in FIG. 5, in the exemplary embodiment at hand, individual user stations 11 through 19 regularly emit training sequences 32. In FIG. 5, the temporal transmission sequence of training sequences 32 and data frames 31 for user stations 11, 12, 13, . . . N is shown by way of example. Thus, training sequences 32 of all user stations 11 through 19 are emitted at regularly recurring time intervals, i.e. cyclically, in the form of separate frames or messages 3. In contrast, the emission of data frames 31 takes place independently of the information of associated training sequence 32. Thus, the emission of data frames 31 is carried out without additional information in the frame contained in training sequence 32. The sum illustration Z in FIG. 5 shows the total occupancy of the parallel bus on bus line 10 of bus system 1.

Particularly in a network having only a few users or user stations as in the case of bus system 1, this method markedly shortens the required time for estimating the channel-pulse responses h(t) and thus increases the net data rate of the overall system Another advantage is that in the exemplary embodiment at hand, the emission of training sequences 32 is able to be carried out as a function of the user and no longer as a function of the message.

Figure 6:
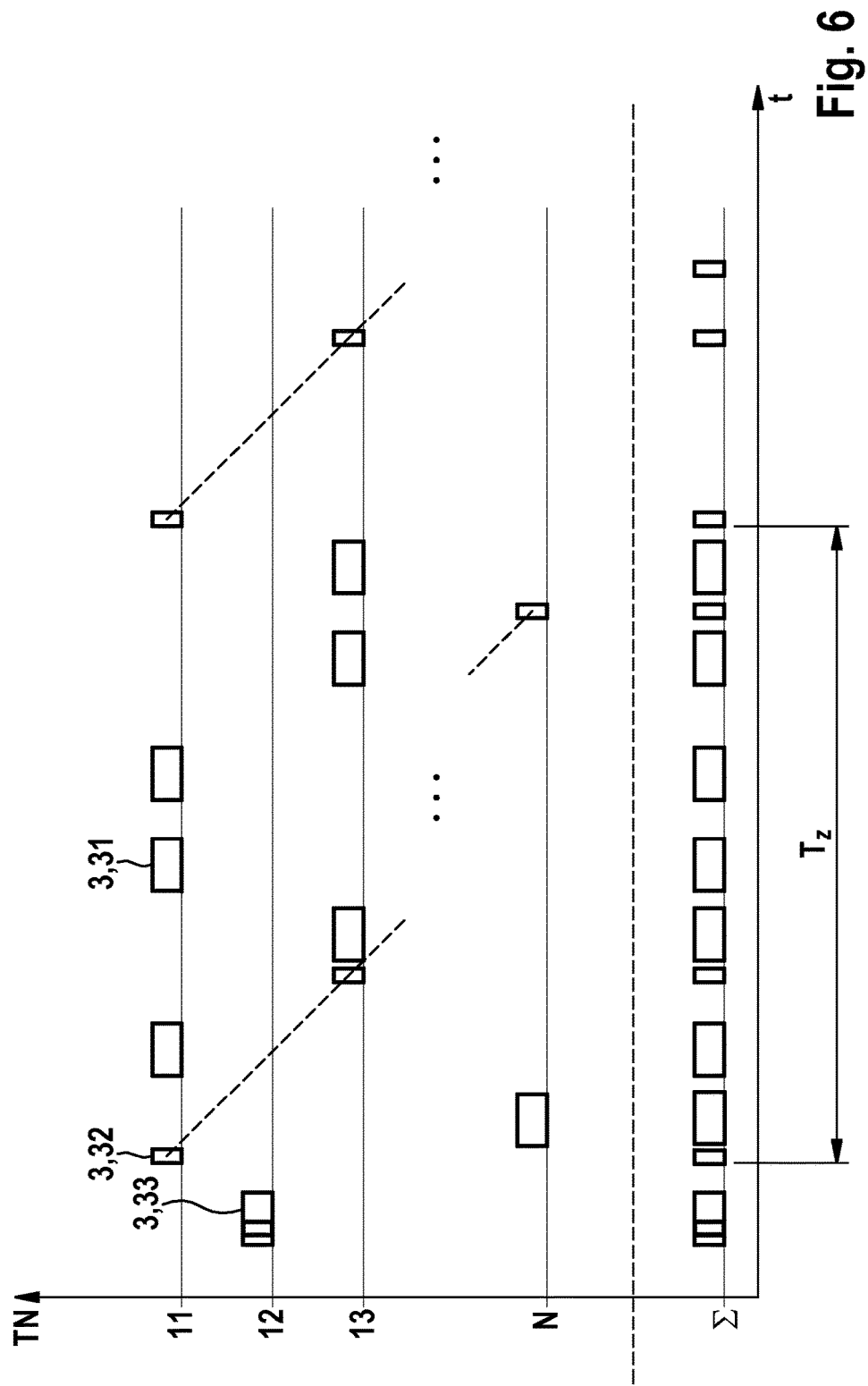
FIG. 6 shows a time sequence diagram to illustrate a transmission of messages of the individual user stations over the time in the bus system according to a second exemplary embodiment.
Figure 7:
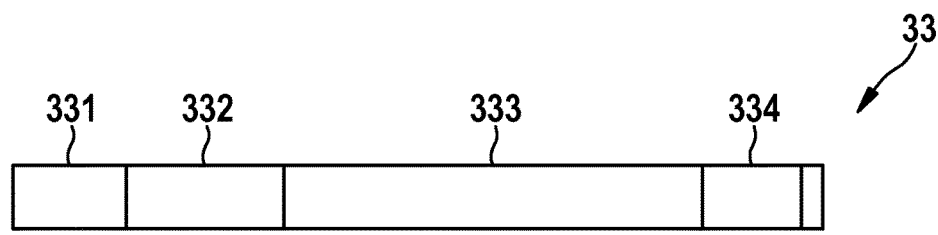
FIG. 7 shows a schematic representation of the structure of a message in a bus system according to the second exemplary embodiment.

FIG. 6 shows a data traffic in a bus system 1 according to a second exemplary embodiment. In this case, a sporadic transmission of supplemented data frames 33, which include a data frame 33 supplemented by a training sequence 332 as illustrated in FIG. 7, is carried out in each recipient in order to ensure current channel-status information at all times. Training sequence 332 may be inserted following a frame head 331 and before a data portion 333 or it may be inserted at any location in data portion 333 of data frame 31. Frame end 334 follows data portion 333.

As illustrated in FIG. 6, the sporadic transmission of supplemented data frames 33 by a user station such as user station 12 may be supplemented by the cyclical transmission of separate training sequence 32 and separate data frame 31 by other user stations 11 and 13 through N. However, here, too, it holds true that user station 12 does not have to send the channel-status information in each message 3. Thus, if a supplemented data frame 33 has already been transmitted as message 3 prior to a predefined time, user station 12 may next send a data frame 31 again initially, i.e., data without training sequence 332.

In the exemplary embodiment at hand, required training sequence 32 is thereby able to be transmitted in a cyclical manner, for example, via dedicated CAN frames, as shown for user stations 11 and 13 through N. In contrast thereto, however, user station 12 sporadically inserts required training sequence 332 as an optional supplement in a CAN frame or in supplemented data frame 33. The supplementation thus takes place according to need, which in particular is not cyclical. For example, via an identifier (flag) in CAN frame head 331, a corresponding announcement is made to the receiving user station of user stations 11 and 13 through N. The sum display Σ in FIG. 6 shows the total occupancy of parallel bus of bus system 1.

In this particular exemplary embodiment, training sequence 332 according to FIG. 7 thus is no separate message 3 with its own frame head and frame end; instead, it includes only the information from the data portion of training sequence 32 according to the first exemplary embodiment that is required for ascertaining the channel-status information. Here, too, at least data field 331, and possibly also training sequence 332, has/have a high-rate data format in order to transmit data according to the specification for CAN-FD or at an even higher data-transmission rate. If training sequence 332 likewise has a high-rate data format, then the net data rate in the bus system is able to be increased even further.

Figure 8:
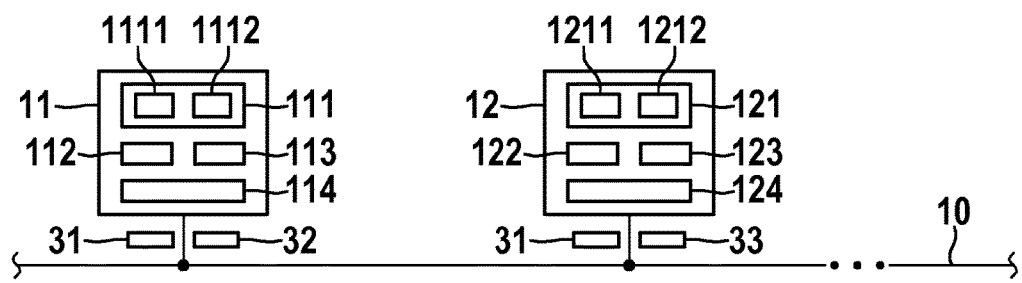
FIG. 8 shows a simplified circuit diagram of a user station of the bus system according to the second exemplary embodiment.

FIG. 8 shows the structure of user station 12 resulting therefrom. User station 12 has a communications control unit 121, a memory unit 122, a correction device 123, and a transmit/receive device 124. Communications control unit 121 includes a data-frame preparation device 1211 for preparing an individual message 3 as a supplemented data frame 33 in the form of a signal for bus line 10. A training sequence 332, prepared by training-sequence preparation device 1212, is embedded in data frame 33, as previously described.

In all other respects, the bus system according to the exemplary embodiment at hand has the same structure as bus system 1 according to the first exemplary embodiment.

In the exemplary embodiment discussed here, user stations 11 and 13 through N thus transmit cyclical training sequences 32 in the form of separate frames, while user station 12 embeds a sporadic training sequence in a CAN frame, i.e., supplemented data frame 33.

The configuration according to the exemplary embodiment at hand is also advantageous in a network having only a few users, as in bus system 1 according to the first exemplary embodiment; the reason for this is that the required time for estimating the channel-pulse responses h(t) is also markedly shortened by the method according to the present invention. Here, too, the emission of training sequences 32 is able to be carried out as a function of the user and no longer as a function of the message, at least for user stations 11 and 13 through N, but also for user station 12.

Figure 9:
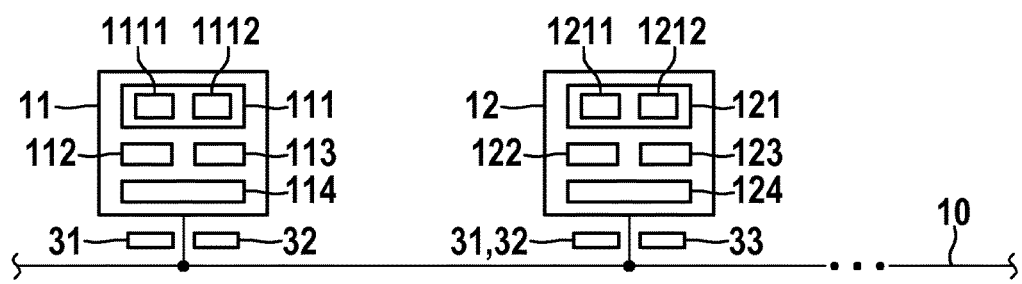
FIG. 9 a simplified circuit diagram of a user station of the bus system according to the second exemplary embodiment.

According to FIG. 9, user station 12 in a third exemplary embodiment may either embed a sporadic training sequence in a frame 33, as described for the second exemplary embodiment, or it may sporadically transmit individual training sequences 32 and individual data frames 31 as separate frames, as described for the first exemplary embodiment. In all other respects the bus system according to the present exemplary embodiment has the same structure as bus system 1 according to the first exemplary embodiment.

In this particular exemplary embodiment as well, as in the case of the first exemplary embodiment, the transmission of training sequences 32, 332 for all user stations 11 through N may be transmitted as a function of the user and not as a function of the message.

All previously described further developments of bus system 1, of user stations 11 through 19, and of the present method may be used on their own or in all kinds of possible combinations. In particular, all of the features of the previously described exemplary embodiments are able to be combined as desired. Especially the following modifications are conceivable in addition.

Previously described bus system 1 according to the exemplary embodiments is described with the aid of a bus system based on the CAN protocol. However, bus system 1 according to the exemplary embodiments can also be another type of communications network. It is advantageous but not a mandatory precondition that an exclusive, collision-free access of a user station 11 through 19 to a shared channel be ensured at least for certain periods of time in bus system 1.

Bus system 1 according to the exemplary embodiments is a CAN network or a TTCAN network or a CAN-FD network, in particular.

The cyclical emission of training sequences 32 may take place in blocked form so that all user stations 11 through 19 transmit their training sequences 32, in corresponding frames, in a temporally coordinated manner according to a fixed scheme, in particular synchronously but at a time offset.

Each user station 11 through 19 may also transmit its messages 3 to another user station or other user stations of user stations 11 through 19 in an asynchronous manner and specify the instant according to its own scheme, e.g., via a timing circuits (timers) having a session timeout functionality (timeout function).

The use of cyclical and sporadic (or embedded in the CAN frame) training sequences 32, 332 may be defined as a function of a user or a user station so that an optimization of the transmission efficiency is achieved, in particular in the sense of the lowest possible overhead component created by frame head 3-1, 331 and frame end 3-3, 333.

Training sequences 32, 332 may be mathematically optimized for the ascertainment of the channel-status information or the channel-pulse response, especially with regard to the employed lengths of sequence 32, 332. Known sequences such as pseudo-noise, Gold codes, Walsh codes, Kasami codes, Barker codes etc. may be used as an alternative.

To emit separate or dedicated frames as training sequences 32 that include no further data contents, certain priorities may be allocated for the prioritization in bus system 1. Among other things, the priority of a training sequence 32 should be selected higher than the priority of all messages 3 emitted by a user station 11 through 19.

In addition to ascertaining the channel-pulse response h(t), training sequences 32, 332 may also be used for ascertaining disturbance variables. In this case, in particular the signal-to-noise ratio (SNR) may be determined. A recipient may use this ratio to determine whether a noise level at which a reception is longer able to be ensured is possibly present.

Through the regular monitoring of channel characteristics with the aid of channel-pulse responses h(t), the monitoring may be utilized for detecting changes in the network characteristics of bus system 1. In particular, a non-allowed intervention in the network of bus system 1, e.g. by additional user stations of user stations 11 through 19 being switched on, is able to be detected.

A use of bidirectional channel-pulse responses h(t) may be employed on both sides for the purpose of generating keys for encrypting messages, which offers a confidentiality protection. For example, if one looks at the two user stations 14, 15, which would like to communicate with each other in encrypted form, then the current channel-pulse response h(t) is available at both user stations 14, 15 following a cycle. Current channel-pulse response h(t) may be used to generate a key (physical key generation), which is not otherwise known to any other user station since the other user stations see different channel-pulse responses h(t).

The number and the placement of user stations 11 through 19 in bus system 1 of the exemplary embodiments are freely selectable. In particular, it is also possible that only user stations 11 or user stations 12 etc. are present in bus system 1 of the exemplary embodiments.

The partitioning of the previously described functionality of data-frame preparation device 1111 and training-sequence preparation device 1112 in a communications device 11 may also be realized in such a way that the previously described functionality is distributed to a plurality of components. In this way, a development that is as similar as possible and corresponds to current CAN controllers and CAN transceivers may be attempted. Analog as well as digital interfaces may be used for the connection of a plurality of components.

Particularly for CAN-FD and systems having higher data rates, user stations 11 through 19 represent an option for raising the reception quality of CAN-FD and such systems to the range of conventional CAN transmissions while utilizing a clearly higher data rate.

For example, the method executed in user stations 11 through 19 is able to be implemented in a transceiver or a transmit/receive device 114, in a communications-control unit 111, etc. In addition or as an alternative, it is able to be integrated into existing products.

What is claimed is:

1. A first user station for a bus system, comprising:
   a transceiver connected to a bus line of the bus system to which a plurality of other user stations are also connected; and
   a memory;
   wherein:
   the first user station is configured to prepare channel-status information of the first user station and transmit the channel-status information of the first user station, via the transceiver, onto the bus line and to the plurality of other user stations during each of a plurality of first cyclically occurring exclusive, collision-free accesses of the first user station to the bus line that are assigned by the bus system to the user station and that occur at respective lapses of a predefined cycle time;
   the first cyclically occurring exclusive, collision-free accesses are offset from other cyclically occurring exclusive, collision-free accesses to the bus line that are assigned to respective ones of the plurality of other user stations during which the respective ones of the plurality of other user stations transmit channel-status information of the respective ones of the plurality of other user stations, which the first user station receives from the bus line via the transceiver and stores in the memory in association with the respective other user stations;
   the first user station is configured to transmit onto the bus line and via the transceiver data messages without the channel-status information of the first user station at times that occur between the first and other cyclically occurring exclusive, collision-free accesses; and
   each of the channel-status information includes information for ascertainment of respective channel characteristics between respective pairs of the first user station and the plurality of other user stations.

2. The first user station as recited in claim 1, wherein a length of the predefined cycle time is such that all of the first user station and the plurality of other user stations of the bus system are able to transmit the respective channel-status information once within the predefined cycle time.

3. The first user station as recited in claim 1, wherein the channel-status information of the first user station is a training sequence broadcast to all of the plurality of other user stations of the bus system in a dedicated frame without any other data.

4. The first user station as recited in claim 1, wherein the channel-status information are each a respective training sequence specific to the particular user station transmitting the training sequence.

5. The first user station as recited in claim 1, wherein the first communications-control unit is configured to ascertain whether a message received by the transceiver from the bus line includes the channel-status information to be stored in the memory.

6. The first user station as recited in claim 5, wherein the first user station is configured to correct a first read message based on channel-status information received with the first read message and correct a second message, received without any channel-status information, based on one of the channel-status information previously stored by the first user station in the memory.

7. The first user station as recited in claim 1, wherein the channel-status information of the first user station is a training sequence transmitted in a message without any other data, other than a frame head and a frame end.

8. The first user station as recited in claim 1, wherein at least one of (a) the first user station, (b) one or more of the plurality of the other user stations, and (c) yet another user station of the bus system is configured to sporadically and non-cyclically transmit the channel-status information independent of the predefined cycle time.

9. The first user station as recited in claim 6, wherein in addition to a frame head and a frame end, the message includes only the training sequence as data portion, or the training sequence is embedded in a data frame as a message.

10. The first user station as recited in claim 1, wherein, at times other than the first cyclically occurring exclusive, collision-free accesses of the first user station to the bus line, the first user station is configured to additionally transmit the channel-status information in a data message together with data to be processed by one or more of the plurality of other user stations.

11. A bus system comprising:
a bus line;
a first user station; and
a plurality of other user stations;
wherein:
the first user station includes:
a transceiver connected to a bus line of the bus system to which a plurality of other user stations are also connected; and
a memory;
the first user station is configured to prepare channel-status information of the first user station and transmit the channel-status information of the first user station, via the transceiver, onto the bus line and to the plurality of other user stations during each of a plurality of first cyclically occurring exclusive, collision-free accesses of the first user station to the bus line that are assigned by the bus system to the user station and that occur at respective lapses of a predefined cycle time;
the first cyclically occurring exclusive, collision-free accesses are offset from other cyclically occurring exclusive, collision-free accesses to the bus line that are assigned to respective ones of the plurality of other user stations during which the respective ones of the plurality of other user stations transmit channel-status information of the respective ones of the plurality of other user stations, which the first user station receives from the bus line via the transceiver and stores in the memory in association with the respective other user stations;
the first user station is configured to transmit onto the bus line and via the transceiver data messages without the channel-status information of the first user station at times that occur between the first and other cyclically occurring exclusive, collision-free accesses; and
each of the channel-status information includes information for ascertainment of respective channel characteristics between respective pairs of the first user station and the plurality of other user stations.

12. A wideband communication method of a first user station of a bus system, the method comprising:
the first user station preparing channel-status information of the first user station;
the first user station transmitting the prepared channel-status information of the first user station onto a bus line of the bus system, and to a plurality of other user stations that are connected to the bus line, during each of a plurality of first cyclically occurring exclusive, collision-free accesses of the first user station to the bus line that are assigned by the bus system to the user station and that occur at respective lapses of a predefined cycle time;
the first user station receiving from the bus line respective channel-status information transmitted by respective ones of the plurality of other user stations at other cyclically occurring exclusive, collision-free accesses to the bus line that are assigned to respective ones of the plurality of other user stations, wherein the first cyclically occurring exclusive, collision-free accesses are offset from the other cyclically occurring exclusive, collision-free accesses;
the first user station storing the received channel-status information in a memory; and
the first user station transmitting onto the bus line data messages without the channel-status information of the first user station at times that occur between the first and other cyclically occurring exclusive, collision-free accesses;
wherein each of the channel-status information includes information for ascertainment of respective channel characteristics between respective pairs of the first user station and the plurality of other user stations.

* * * * *